A. SCHADE.
NON-RETURN STOP VALVE.
APPLICATION FILED MAR. 18, 1914.

1,137,910.

Patented May 4, 1915.
2 SHEETS—SHEET 1.

WITNESSES:
R. Schleicher
Jos. G. Denny

INVENTOR:
Albert Schade,
BY
Charles N. Butler
ATTORNEY.

A. SCHADE.
NON-RETURN STOP VALVE.
APPLICATION FILED MAR. 18, 1914.

1,137,910.

Patented May 4, 1915.
2 SHEETS—SHEET 2.

WITNESSES:
R. Schleicher
Jos. G. Denny

INVENTOR:
Albert Schade,
BY
Charles N. Butler
ATTORNEY.

UNITED STATES PATENT OFFICE.

ALBERT SCHADE, OF PHILADELPHIA, PENNSYLVANIA.

NON-RETURN STOP-VALVE.

1,137,910. Specification of Letters Patent. Patented May 4, 1915.

Application filed March 18, 1914. Serial No. 825,500.

*To all whom it may concern:*

Be it known that I, ALBERT SCHADE, a citizen of the United States residing in the city of Philadelphia, county of Philadelphia, and State of Pennsylvania, have invented certain Improvements in Non-Return Stop-Valves, of which the following is a specification.

My invention is an improved mechanism comprising one or more valves adapted to be automatically opened to permit the passage of fluid in one direction and automatically closed to prevent a return flow, in combination with an auxiliary valve adapted to cover and uncover the passage or passages of the valve or valves first named.

In its preferred construction, it comprises a case containing a cage or box having passages controlled by and controlling a plurality of check or non-return valves provided with means for guiding, limiting and cushioning their movements of reciprocation, in combination with a manually operated stop valve adapted for closing the cage or box to prevent flow in either direction.

The leading object of my improvements is to provide a simple, accessible and efficient non-return stop valve having parts that are readily assembled and dissociated.

Figure 1:
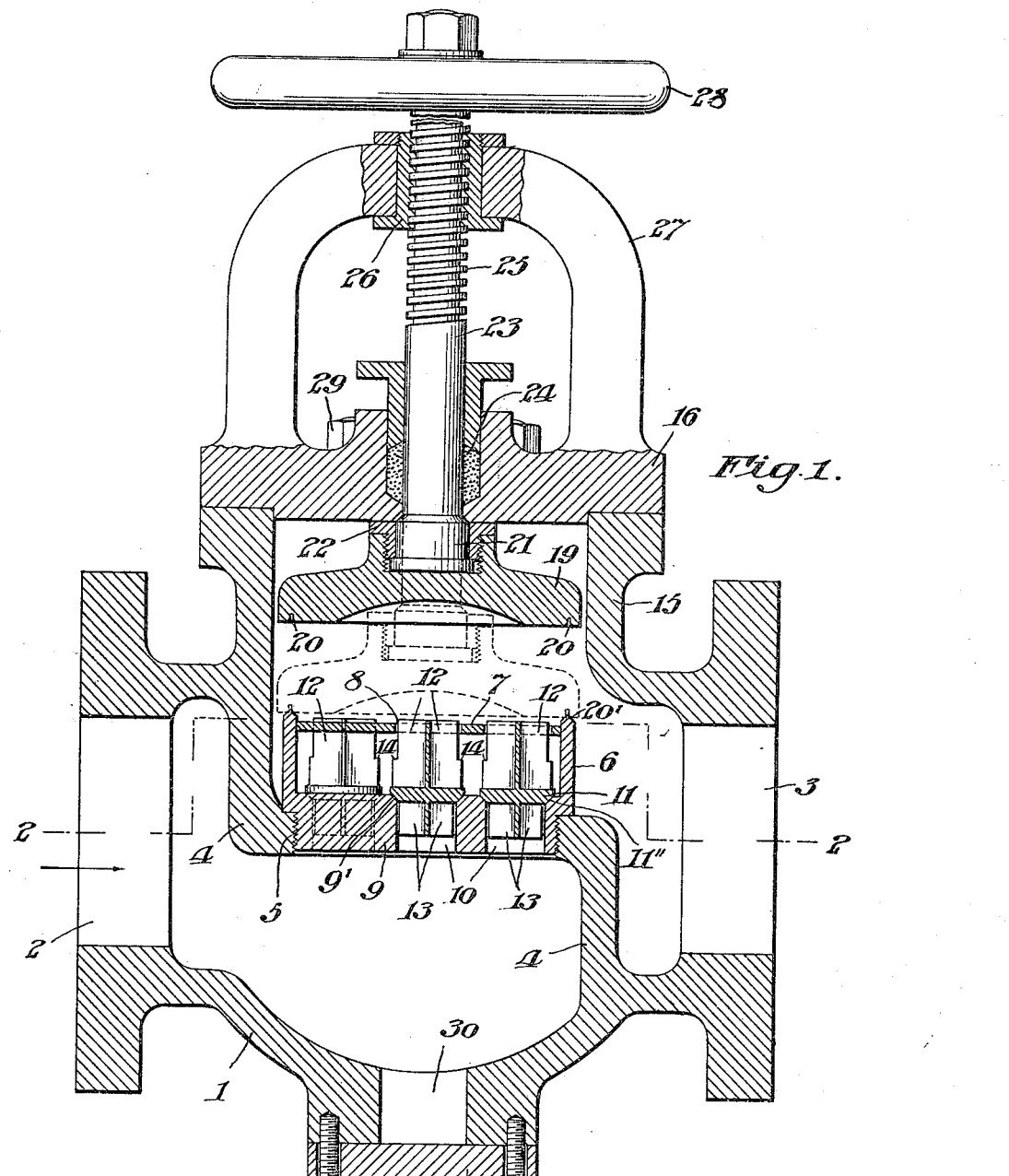
Figure 2:
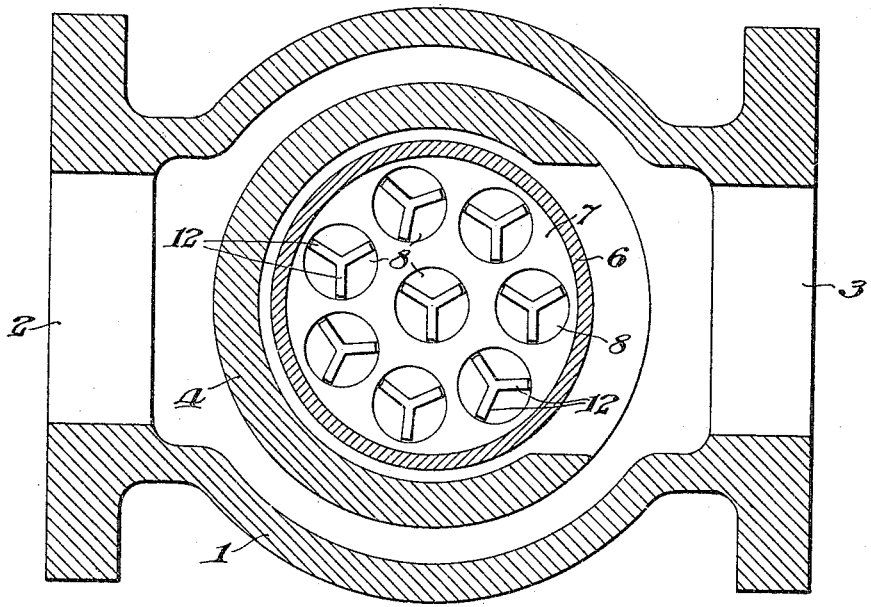
Figure 3:
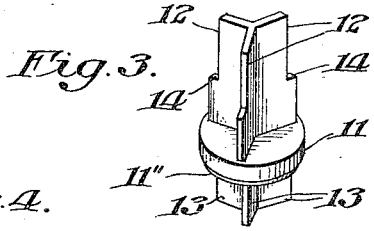
Figure 4:
Figure 4:
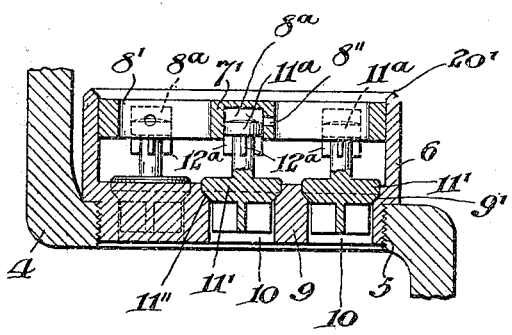

In the accompanying drawings, Figure 1 is a sectional view of a valve embodying my improvements; Fig. 2 is a sectional view taken on the line 2—2 of Fig. 1; Fig. 3 is a perspective view of a detached check or non-return valve; Fig. 4 is a vertical sectional view representing a preferred form of the check valve mechanism; and Fig. 5 is a top plan view of details of the construction shown in Fig. 4.

The mechanism, as illustrated in the drawings, comprises a valve case 1 having the inlet 2 and the outlet 3 between which is the diaphragm 4 containing a threaded aperture 5.

As shown in Figs. 1, 2 and 3, a cylindrical box or cage 6 is provided with a diaphragm 7 containing the apertures or passages 8 and a threaded base or diaphragm 9 containing the ports or passages 10, the base being screwed into the aperture 5. Check valves 11 control the passages 10 and are controlled by the guide wings 12 movable in the passages 8 and guide wings 13 movable in the passages 10, the wings 12 being provided with the shoulders 14 adapted to engage the diaphragm 7 and prevent the wings 13 from being wholly withdrawn from the passages 10.

Figure 5:
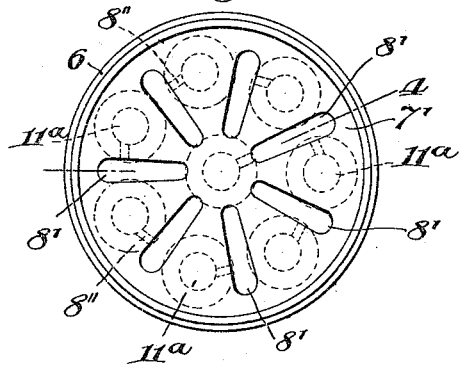

As shown in Figs. 4 and 5, the diaphragm has screwed into its aperture 5 a box or cage 6 provided with a diaphragm 7' containing the apertures or passages 8' and the threaded base or diaphragm 9 containing the ports or passages 10, the base being screwed into the aperture 5. The check valves 11' which control the passages 10 are provided with pistons 11$^a$ and the guide wings 12$^a$ which work in the cylinders or chambers 8$^a$ of the part 7', these chambers being connected with the passages 8' by ducts 8''. When these valves 11' are seated, steam can pass through the passages 8'' into the chambers 8$^a$ and when the valves are lifted from their seats, the steam is trapped in the chambers due to the closure of these passages by the pistons, whereby the rise of the pistons is cushioned, undesirable sharp impact of the parts is avoided, and chattering is prevented. The pistons are made comparatively loose in the chambers so that the confined steam can escape past them to provide a dash pot action and the wings prevent lateral or oscillatory movement of the elevated valves.

As the valves are returned to their seats, by gravity and the pressure of steam that may be confined in the chambers, they are cushioned in seating by the action of steam flowing through the passages 10 on the undercut conical valves surfaces 11'' which fit the complementary conical surfaces 9, of the valve seats.

A cap 16 is fixed to the cylindrical case-branch 15 which contains the stop valve 19 having the circular seat or channel 20 adapted to fit the circular wedge 20' at the top of the box 6, this valve being carried by a stem having a cylindrical head 21 engaged in revoluble relation to the valve by the bush 22, a cylindrical section 23 revoluble in and longitudinally movable through the packing 24 of the cap, the threaded section 25 adapted to run in the nut 26 of the yoke 27 on the cap, and the wheel 28 by which the stem is fed through the nut. As the cap 16 is held in place by the bolts 29, it can be attached and detached readily to examine, place, displace or repair the cage or box 6 with the parts thereof, or the valve 19 with its connections.

An aperture 30 is formed in the bottom of the case 1, and normally covered by a plate 31 held in place by screws 32 for convenience.

It will me understood that in operation, with the stop valve 19 in the retracted position shown, steam or other fluid acting through the inlet 2 against the valves 11 or 11' with sufficent force to lift them, will flow through the passages 10 and 8 to the outlet 3, while back pressure will be communicated through the passages 8 to seat the valves 11. When it is desired to close the line containing the case 1, the valve 19 is screwed down on the cage 6.

Having described my invention, I claim:

1. A valve mechanism comprising a case provided with a diaphragm containing passages, non-return valves for controlling said passages, a wall connected with said diaphragm and inclosing said passages and valves, and a stop valve in said casing and adapted to be seated on said wall.

2. A valve mechanism comprising a case containing a box provided with passages, non-return valves adapted for controlling said passages, said valves having guide means movable in said passages, and a stop valve in said case for closing said box.

3. A valve mechanism comprising a case containing a diaphragm having a passage or passages therein, a non-return valve or valves for controlling said passage or passages, a wall within said case extending from said diaphragm in the direction of movement of said valve or valves therefrom, means within said wall for guiding the movements of said valve or valves, and a stop valve in said case and adapted to engage said wall whereby the flow through said case is stopped.

4. A valve mechanism comprising a case containing a diaphragm having a passage or passages therein, a non-return valve or valves for controlling said passage or passages, a wall in said case extending from said diaphragm in the direction of movement of said valve or valves therefrom, valve guiding means within said wall, means on said valve or valves coöperating with said guiding means for controlling the movements of said valve or valves, and a stop valve within said case and adapted to be seated on said wall to hold said non-return valve or valves seated.

5. A valve mechanism comprising a diaphragm containing passages adapted for seating valves, a wall connected with said diaphragm, a device containing through passages and chambers fixed to said wall, fluid passages communicating with said chambers, non-return valves adapted for controlling said passages first named, pistons connected with said valves and adapted to act in said chambers to control the movement of said valves, and a stop valve adapted to be seated on said wall.

In testimony whereof I have hereunto set my name this 17th day of March, 1914, in the presence of the subscribing witnesses.

ALBERT SCHADE.

Witnesses:
Jos. G. Denny, Jr.,
C. N. Butler.

Copies of this patent may be obtained for five cents each, by addressing the "Commissioner of Patents, Washington, D. C."